United States Patent [19]

Adachi

[11] 3,998,128
[45] Dec. 21, 1976

[54] HYDRAULIC POWER BOOSTER SYSTEM
[75] Inventor: Yoshiharu Adachi, Toyota, Japan
[73] Assignee: Aisin Seiki Kabushiki Kaisha, Kariya, Japan
[22] Filed: Apr. 29, 1975
[21] Appl. No.: 572,646

[30] Foreign Application Priority Data
May 24, 1974 Japan .............. 49-59160
May 31, 1974 Japan .............. 49-62432
Nov. 22, 1974 Japan ............. 49-134531

[52] U.S. Cl. .................... 91/29; 91/391 R
[51] Int. Cl.² ...................... F15B 13/04
[58] Field of Search .......... 91/431, 28, 29, 391, 91/412; 60/413, 418, 548, 582, 547, 404, 422; 303/52, 21 F, 50, 10

[56] References Cited
UNITED STATES PATENTS

| | | | |
|---|---|---|---|
| 2,945,352 | 7/1960 | Stelzer | 91/28 X |
| 3,253,409 | 5/1966 | Kellogg et al. | 60/548 |
| 3,603,209 | 9/1971 | MacDuff et al. | 91/391 R |
| 3,633,363 | 1/1972 | Larsen | 60/548 X |
| 3,688,498 | 9/1972 | Bach et al. | 60/548 X |
| 3,841,095 | 10/1974 | Baker | 60/413 X |
| 3,898,809 | 8/1975 | Baker | 91/28 X |

Primary Examiner—Trygve M. Blix
Assistant Examiner—Douglas C. Butler
Attorney, Agent, or Firm—Finnegan, Henderson, Farabow & Garrett

[57] ABSTRACT

A hydraulic power booster system having a power piston which may be adapted to be connected with an input member of a brake master cylinder and which is actuated when hydraulic pressure fluid is introduced into a power pressure chamber defined at one side of the power piston. An orifice is disposed between a hydraulic pressure source and hydraulic pressure reservoir with an opening that is restrictable for establishing a hydraulic pressure drop thereacross when a brake pedal is actuated. A control valve introduces the hydraulic pressure fluid from the pressure source to the power pressure chamber in response to a pilot hydraulic pressure established in a pilot chamber defined by the control valve upstream of the orifice. The flow of controlled hydraulic fluid through the pilot chamber becomes restricted for establishing the pilot hydraulic pressure therein when the brake pedal is actuated for restricting the opening of the orifice and thus establishing a hydraulic pressure drop thereacross.

10 Claims, 6 Drawing Figures

HYDRAULIC POWER BOOSTER SYSTEM

The present invention relates to hydraulically operated boosting means for vehicles. More particularly, the present invention pertains to hydraulic boosting means which is particularly suitable for use with vehicle brake means, although not limited to such a use.

In a vehicle equipped with hydraulically operated brake means having hydraulic master cylinder means, hydraulically operated boosting means may be associated with the master cylinder means so that the latter may be actuated by the former with the assistance of hydraulic power. Such boosting means normally includes a variable orifice which is controlled by manually actuated means such as a brake actuating pedal, and unrestricted flow of hydraulic fluid is normally established through the orifice so that there is no pressure drop across the orifice. When the manual means is actuated, the opening of the orifice is closed or decreased in area to produce pressure difference across the orifice. The increased hydraulic pressure in the upstream side of the orifice is then utilized to actuate power piston means in the boosting means, which in turn actuates the master cylinder. The hydraulically operated boosting means is usually provided with safety means which enables actuation of the master cylinder even under a failure of hydraulic pressure source.

An object of the present invention is to provide hydraulically operated boosting means which includes novel means for enabling operation of the boosting means under a failure of hydraulic pressure source.

Another object of the present invention is to provide hydraulically operated boosting means which includes means for drawing hydraulic pressure from hydraulic pressure accumulating means under a failure of hydraulic pressure source so as to actuate power piston means equipped therein.

A further object of the present invention is to provide hydraulically operated boosting means which includes manually operated means for producing a pilot pressure which is used to open valve means between hydraulic pressure accumulating means and power piston means so as to introduce hydraulic pressure from the accumulating means into the power piston means under a failure of hydraulic pressure source.

According to the present invention, the above and other objects can be accomplished by hydraulically operated boosting means comprising power piston means received in power cylinder means and defining pressure chamber means in said power cylinder means at one side thereof, orifice means disposed between a hydraulic pressure source and a hydraulic reservoir and having opening means which normally allows unrestricted flow of hydraulic fluid, manually operated means for restricting the opening means of the orifice means so as to establish pressure drop thereacross, first control valve means responsive to the pressure at the upstream side of the orifice means so as to introduce hydraulic pressure from said pressure source into the pressure chamber means when the pressure drop is established across the orifice means, the improvement comprising the fact that said orifice means includes control piston means slidably received in control cylinder bore means, hydraulic pressure accumulating means being provided and connected with said pressure chamber means through normally closed second control valve means, means for opening said second control valve means when the control piston means is shifted beyond a predetermined distance.

According to one aspect of the present invention, said control piston means slidably received in the control cylinder bore means defines first and second control chamber means in the cylinder bore at the opposite sides thereof, the opening means in the orifice means connecting said first and second control chamber means, said first chamber means being connected to said hydraulic pressure source and said second control chamber means to said hydraulic reservoir, said first control valve means being associated with said second control valve means in such a manner that the former serves to open the latter when the former is shifted under the influence of the pressure in the first control chamber means beyond a predetermined distance.

According to another aspect of the present invention, said control piston means is provided with means for opening the second control valve means when it is shifted beyond said predetermined value. Such means for opening the second control valve means may be embodied in the form of a rod integrally formed with the control piston means.

The above and other objects and features of the present invention will become apparent from the following descriptions of preferred embodiments taking reference to accompanying drawings, in which.

Figure 1:
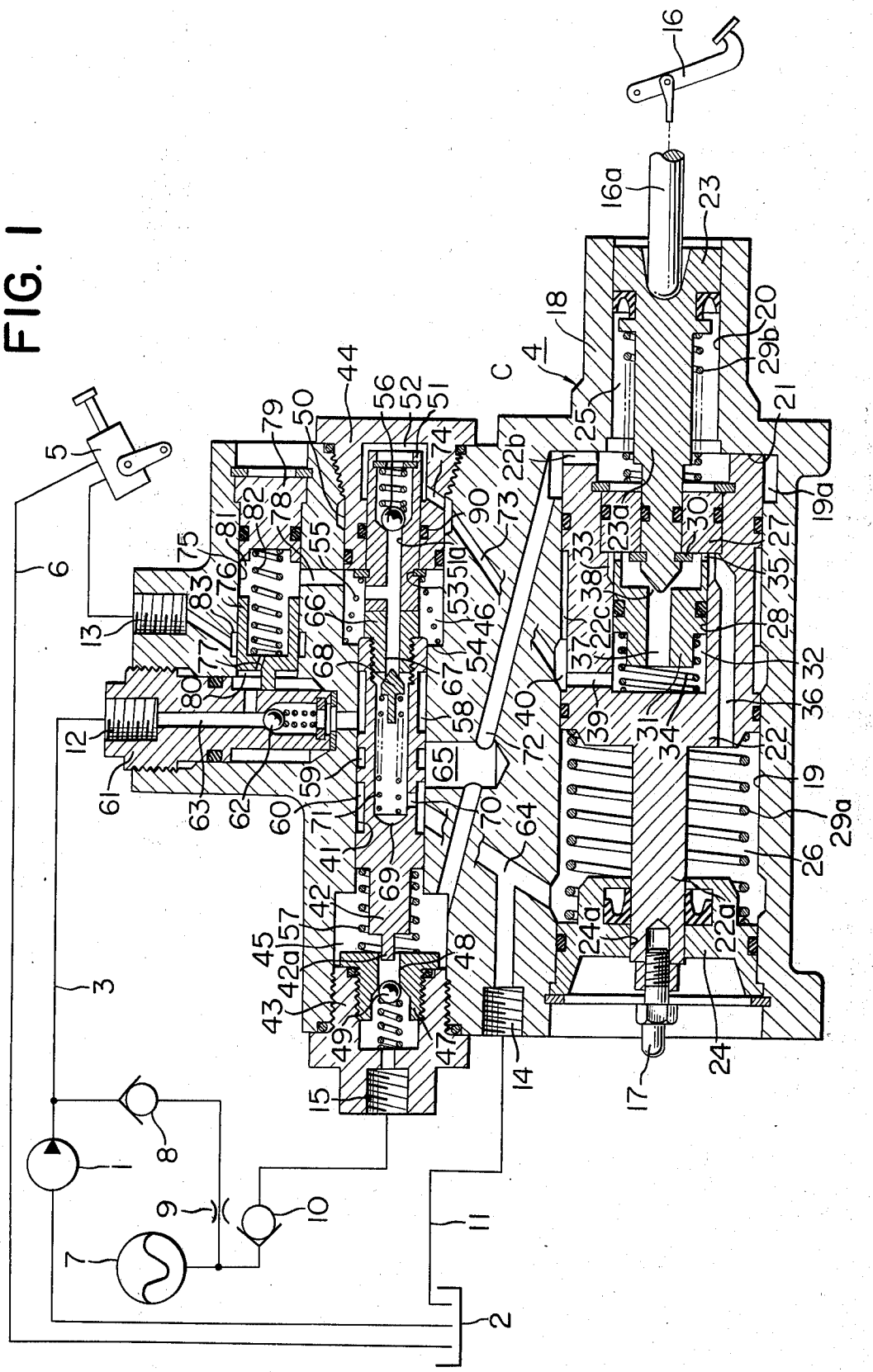
FIG. 1 is a diagrammatical sectional view of a hydraulic boosting device in accordance with one embodiment of the present invention.
Figure 2:
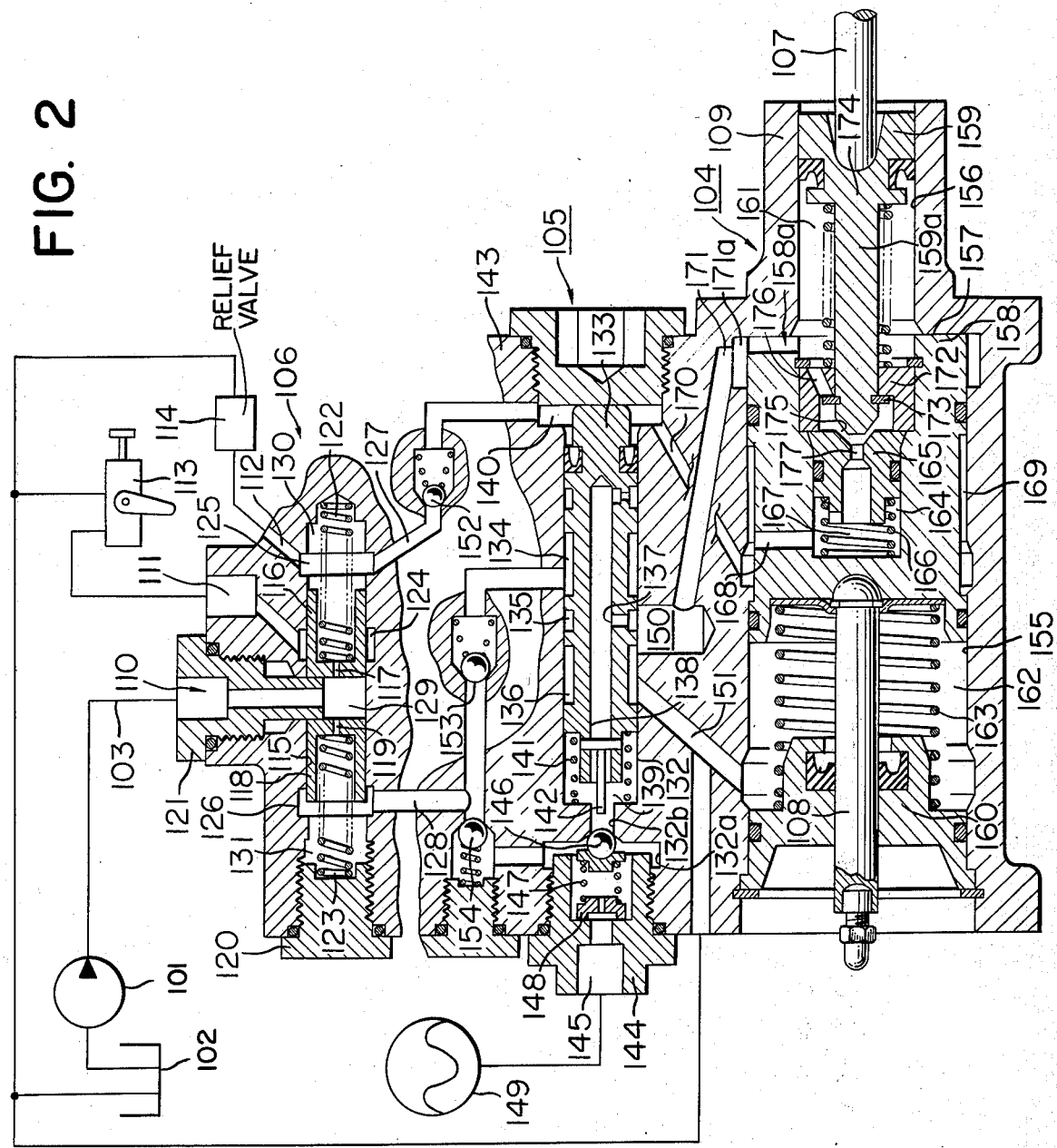
FIG. 2 is a view similar to FIG. 1 but showing another embodiment of the present invention.

Referring now to the drawings, particularly to FIG. 1, the hydraulic boosting device is generally shown by the reference numeral 4 and includes a housing C formed with co-axial cylindrical bores 19 and 20. The bore 20 is smaller in diameter than the bore 19 and an annular shoulder 21 is formed between the bores. An end disc 24 is secured to the housing C at the open end of the bore 19 and a power piston 22 is disposed for reciprocating movement in the bore 19. The power piston 22 has a piston rod 22a which is integrally formed with the power piston 22 and projecting outwardly through a guide hole 24a in the end disc 24. The piston rod 22a is adapted to be connected with an input member of a brake master cylinder (not shown) by a screw 17. An input piston 23 is disposed in the bore 20 for reciprocating movement therein and actuated by a brake actuating pedal 16 through a push rod 16a. The power piston 22 has an axially extending cylindrical bore 28 which opens toward the input piston 23. An end plate 27 is secured to the power piston at the open end of the bore 28. The input piston 23 has a piston rod 23a which is integrally formed therewith and guided in the axial direction by the end plate 27. The power piston 22 is biased rightwardly by a spring 29a which acts between the end disc 24 and the power piston 22. A second spring 24b is disposed between the end plate 27 and the input power piston 23 so as to bias the latter toward the right. It will be seen that the power piston 22 separates the bore 19 into chambers 25 and 26. The chamber 25 may be referred to as a pressure chamber and is always in communication through a radial passage 22b in the power piston 22 with an annular groove 19a formed in the bore 19 at the end adjacent to the bore 20. The chamber 26 may be referred to as a return chamber and connected through a passage 64, an outlet port 14 and a return line 11 with a reservoir 2.

In the bore 28 formed in the power piston 22, there is disposed a control piston 31 which has an axial bore 37. The piston rod 23a on the input piston 23 is projecting through the end plate 27 into the bore 28 and has a tapered end which co-operates with an end of the axial bore 37 to form a control orifice 38. A stopper 30 is provided on the piston rod 23a in order to prevent the piston rod 23a from being excessively retracted.

The bore 28 is formed at the end adjacent to the end plate 27 with an annular groove 33 which is connected through a passage 36 in the power piston 22 with the return chamber 26 and through cutouts 35 in the control piston 31 with the orifice 38. A spring 34 is disposed between the power piston 22 and the control piston 31 and biases the latter toward the right against the end place 27. Thus, a chamber 32 is defined in the bore 28 at the left side of the control piston 31. The cylindrical bore 19 is formed with an annular groove 40 at the intermediate portion thereof and the power piston 22 has a circumferential groove 22c which is always in communication with the annular groove 40. The power piston 22 has a radial passage 39 which connects the chamber 32 with the circumferential groove 22c.

The housing C is further formed with a cylindrical bore 41 which is formed in parallel with the bore 19. The bore 41 is enlarged at the left end thereof and has an inlet fitting 43 which is threaded into the housing C and formed with an inlet port 15. The bore 41 is also enlarged at the right end thereof and closed by a plug 44 secured to the housing C. A valve spool 42 is slidably received in the bore 41 and chambers 45 and 46 are defined in the bore 41 at the opposite ends of the spool 42. The spool 42 is formed with three axially spaced circumferential grooves 58, 59 and 60. The groove 58 is in communication through a check valve 62 and a passage 63 with an inlet port 12 which is in turn connected through a line 3 with a hydraulic pump 1. The groove 59 is in communication with a cavity 65 which is connected through a passage 72 with the chamber 45 and the annular groove 19a. The groove 60 is always in communication with the passage 64 which is connected with the outlet port 14 as previously described. The grooves 58, 59 and 60 are so located that, when the spool 42 is shifted toward the right, the groove 60 bridges the cavity 65 and the passage 64 to exhaust the pressure in the pressure chamber 25. However when the spool 42 is shifted toward the left, the groove 58 connects the cavity 65 with the passage 63 through the check valve 62 so as to introduce hydraulic pressure into the pressure chamber 25.

In the chamber 45, a seat member 47 having an axial bore 48 is secured to the inlet fitting 43 and a ball 49 is normally biased to close the axial bore 48. The spool 42 has an axial projection 42a at the right end thereof for pushing the ball 49 away from the seat member 47 to open the bore 48 when the spool 42 is shifted to the extreme left position. A spring 57 is disposed between the seat member 47 and the spool 42 so as to bias the latter toward the right. The spool 42 is formed with an axial bore 69 which is connected through a radial passage 70 with the circumferential groove 60. A plug 66 having an axial bore 67 is secured to the spool 42 to close the open end of the bore 69. A valve member 68 is disposed in the bore 69 and biased by means of spring 71 toward the plug 66 so as to co-operate with the axial bore 67 formed therein.

The end plug 44 is formed with an axial bore 50 which opens toward the chamber 46, and a piston 51 is axially slidably received in the bore 50. An O-ring seal 90 is disposed around the piston 51 to prevent leakage along the outer surface of the piston 51. The piston 51 has a stopper 53 which is adapted to be brought into abutting engagement with the left end of the plug 44 so as to leave a chamber 52 in the bore 50 at the right side of the piston 51. The piston 51 has an axial passage 51a connecting the chamber 52 with the chamber 46. A check valve 56 is provided in the piston 51 to close the passage 51a. The piston 51 is biased toward the right by means of a spring 55 which is disposed in the chamber 46. The plug 44 is formed with a radial passage 74 which connects the chamber 52 with a passage 73 leading to the annular groove 40.

The output line 3 of the hydraulic pump 1 is connected through a check valve 8 and an orifice 9 with a pressure accumulator 7 which is also connected through a check valve 10 with the inlet port 15.

The housing C is further formed with a bore 75 which is closed at one end by a plug 79 and connected at the other end with the passage 63. A piston 76 having an orifice 77 is disposed for sliding movement and biased toward the left by means of a spring 82. The piston 76 separates the bore 75 into chambers 80 and 81, the former being connected with the passage 63 and the latter with the chamber 46 through a passage 78. The bore 75 is formed with an annular groove 83 which is connected through a power steering actuator 5. The reference numeral 6 designates a hydraulic fluid return line from the steering actuator 5.

In operation, the hydraulic pump 1 is driven by a suitable power source so as to draw hydraulic fluid from the reservoir 2 and supply pressurized fluid through the pressure line 3 into the inlet port 12. The pressurized hydraulic fluid supplied to the port 12 is then directed through the passage 63 into the chamber 80 to force the piston 76 toward the right. A part of the pressurized fluid in the chamber 80 is then passed through the orifice 77 into the chamber 81 and then through the passage 78 into the chamber 46. The remaining part of the pressurized fluid is directed through the groove 83 and the outlet port 13 into the power steering actuator 5. The fluid in the chamber 46 is passed through the passage 51a, the check valve 56, the chamber 52, the passages 74 and 73, the annular groove 40, the passage 39, the chamber 32, the passage 37, the orifice 38, the groove or low pressure chamber 33 and the passage 36 into the chamber 26, and then returned through the passage 64, the outlet port 14 and the line 11 into the reservoir 2. Since the orifice 38 is opened at this stage of operation, there is unrestricted flow of hydraulic fluid from the chamber 81 to the reservoir 2 whereby pressure is not established in the downstream portions of the orifice 80. Thus, the piston 51 is forced toward the right by the spring 55 to the position where the stopper 53 abuts the plug member 44 as shown in FIG. 1. Since pressure is not established in the chamber 46, the spool 42 is also shifted under the influence of the spring 57 to the extreme right position where it abuts the piston 51. Therefore, the cavity 65 is connected through the groove 60 with the passage 64 so as to exhaust the pressure in the pressure chamber 25 into the reservoir 2. Thus, the power piston 22 is maintained in the extreme right position as shown in FIG. 1 under the influence of the spring 29a and the brake master cylinder connected to the outer end of the piston rod 24a is maintained in the brake release position.

In this situation, when the power steering actuator 5 is operated, there will be a pressure increase in the chamber 80. However, since the orifice 77 in the piston 76 restricts transfer of pressure from the chamber 80 into the chamber 81, there will be no pressure build in the chamber 81. Although the hydraulic pressure from the pump 1 is introduced through the passage 63 and the check valve 62 into the groove 58, this pressure does not have any effect on the position of the spool 42. The hydraulic pressure from the pump 1 is also introduced through the check valve 8 and the orifice 9 into the pressure accumulator 7 to be stored therein.

When the brake pedal 16 is depressed, the input piston 23 is shifted toward the left against the action of the spring 29b so that the area of the variable orifice 38 is decreased. Thus, the flow resistance across the orifice 38 is increased and pressure is built up in the portions on the upstream side of the orifice 38. The pressure in the chamber 32 serves to force the piston 31 against the end plate 27 whereby the position of the piston 31 and thereafter the position of the passage 37 is strictly maintained with respect to the power piston 22.

Since the pressure is built up in the chamber 46 as well as in the chamber 52, the piston 51 is maintained stationary. The pressure in the chamber 46 serves to displace the spool 42 toward the left until the groove 58 communicates with the cavity 65 and the communication between the cavity 65 and the groove 60 is interrupted. Thus, the pressurized hydraulic fluid from the pump 1 is allowed to pass through the line 3, the passage 63 and the check valve 62 into the groove 58, and then through the cavity 65 and the passage 72 into the pressure chamber 25 and also into the chamber 45. The pressure in the chamber 45 serves to force the spool 42 toward the right against the pressure in the chamber 46, so that the spool 42 is held in the neutral position when the pressure in the chamber 46 is balanced with the pressure in the chamber 45 and the force applied by the spring 57. Therefore, it should be noted that a pressure proportional to the pressure in the chamber 46 is applied to the pressure chamber 25.

The pressure introduced into the pressure chamber 25 serves to force the power piston 22 toward the left against the action of the spring 29b so as to actuate the brake master cylinder (not shown). The pressure in the pressure chamber 25 is also applied to the input piston 23, whereby the position of the input piston 23 is influenced by the pressure in the chamber 25 to change the area of the variable orifice 38 until the pressure in the chamber 25 is balanced with the force applied to the input piston 23 by the brake pedal 16. It should be noted herein that the spool 42 functions as the first control valve for controlling the pressure in the chamber 25 by establishing selective communication between the cavity 65 and the grooves 58 and 60. When the power steering actuator 5 is operated, there may be a change in pressure in the chamber 80. However, any change in the pressure in the chamber 80 does not have any effect on the operation of the boosting device.

When there is a failure of the pump 1, the supply of the pressurized hydraulic fluid by the pump 1 is terminated, so that the flow of the hydraulic fluid through the variable orifice 38 is also terminated. In this situation, normal actuation of the input piston 23 by the brake actuating pedal 16 does not cause any increase in the pressure of the chamber 32 even if the orifice 38 is completely closed. However, when the input piston 23 is further shifted toward the left after the orifice 38 is completely closed, the piston 31 is shifted toward the left together with the input piston 23, whereby a pressure is built up in the chamber 32. The pressure in the chamber 32 is transmitted through the passages 73 and 74 into the chamber 52 but prevented from being transmitted to the chamber 46 due to the existence of the check valve 56. Thus, a pressure difference is produced between the chambers 46 and 52 and the piston 51 is shifted toward the left under the influence of the pressure in the chamber 52 against the action of the spring 55. The spool 42 is also shifted toward the left together with the piston 51 against the influence of the spring 57. Therefore, the cavity 65 is blocked from the communication with the passage 64 leading to the reservoir 2 and brought into communication with the groove 58. As the spool 42 is shifted further leftwardly, the left end projection 42a on the spool 42 engages the ball 49 and pushes it away from the seat 47. Thus, the pressurized fluid in the accumulator 7 is allowed to flow through the check valve 10, the inlet port 15, and the valve port 48 into the chamber 45. Since the chamber 45 is in communication with the pressure chamber 25 through the passage 72, the pressurized fluid in the chamber 45 is introduced into the chamber 25 so as to displace the power piston 22 toward the left against the action of the spring 29b. The pressurized fluid in the cavity 65 is allowed to enter the groove 58, however, due to the existence of the check valve 62, it is blocked from entering the passage 63.

It should be noted herein that, as the pressure in the chamber 45 increases to such a value that the rightward biasing force by the pressure in the chamber 45 and the springs 55 and 57 applied to the spool 42 and the piston 52 exceeds the leftward biasing force applied to the piston 52 by the pressure in the chamber 52, the spool 42 and the piston 51 are shifted as a unit toward the right and the check valve 49 is closed. In this manner, the pressure in the chamber 45 and thus the pressure in the pressure chamber 25 is proportional to the pressure in the chamber 52. The input piston 23 is subjected to the pressure in the chamber 25 as well as to the pressure in the chamber 32 which acts thereon through the piston 31. Therefore, the rightward force acting on the input piston 23 increases as compared when the hydraulic pump 1 is normally operating. This will give a warning to the operator that the hydraulic pump 1 is out of operation. The check valve 49 constitutes the second control valve for introducing hydraulic fluid from the accumulator 7 to the pressure chamber 25.

When the accumulator is exhausted of the pressurized hydraulic fluid, the power piston 22 can be manually operated by shifting the input piston 23 further leftwardly after the control piston 31 is displaced to the extreme left position in the cylinder bore 28.

The above embodiment of the present invention is advantageous in that the piston 51 is maintained stationary during normal operation wherein the hydraulic pump 1 is supplying a normal pressure to the line 1, so that the existence of the O-ring seal 90 disposed around the piston 51 does not apply any resistance to the movement of the spool 42.

Referring now to FIG. 22 which shows another embodiment of the present invention, the boosting device 104 includes a housing 109 which is formed with a cylindrical bore 155 and a second cylindrical bore 156 coaxial with the bore 155 so that an annular shoulder 157 is formed at the junction of the bores 155 and 156. A power piston 158 is disposed for sliding movement in the bore 155 and a piston rod 108 is secured to the power piston 158. The opening end of the bore 155 is closed by an end disc 160 through which the piston 108 extends in an axially slidable manner. As in the previous embodiment, the outer end of the piston rod 108 is connected to the input member of a brake master cylinder (not shown). The power cylinder 158 defines chambers 161 and 162 at the opposite sides thereof. The chamber 161 at the side of the bore 156 may be referred to as a pressure chamber. The chamber 162 at the opposite side may be referred to as a return chamber and connected through a return passage 151 to a reservoir 102. An input piston 159 is disposed in the bore 156 for sliding movement and connected with an input rod 107 which may in turn be connected with a brake actuating pedal (not shown) or the like.

The power piston 158 is formed with a cylindrical bore 164 having an end opening to the end of the power piston 158 facing to the input piston 159. An end plate 172 is secured to the power piston 158 at the open end of the bore 164 and has a passage 176 connecting the bore 164 with the pressure chamber 161. In the cylindrical bore 164, there is slidably disposed an orifice member 165 which has an axial passage 177 formed therein. The input piston 159 has an integrally formed piston rod 159a which extends through the end plate 172 into the bore 164 so as to co-operate at its terminal end with the axial passage 177 in the orifice member 165 to define an orifice 175.

A spring 163 is disposed in the return chamber 162 in such a manner that it acts between the end plate 160 and the power piston 158 so as to force the latter toward right until it abuts the annular shoulder 157. The housing 109 is formed with an annular groove 171a at the right end of the bore 155 and a passage 171 is connected with the groove 171a. The power piston 158 is formed at its right end surface with a radial passage 158a so that the groove 171a is always in communication with the pressure chamber 161.

The orifice member 165 is biased toward the right by means of a spring 166 disposed in the bore 164 so as to abut the end plate 172. Thus, a chamber 167 is defined at the left side of the disc 172. In the bore 156, there is disposed a spring 174 which acts between the end plate 172 on the power piston 158 and the input piston 159 so as to urge the latter toward the right. The power piston 158 is formed with a circumferential groove 169 which is always in communication with a passage 170 formed in the housing 109.

The housing 109 is further formed with a cylindrical bore 132 in which a valve spool 133 is slidably received. The bore 132 has an open end which is closed by a plug 143. At the right end of the bore 132, there is formed an annular groove 140 which is connected with the passage 170. A chamber 139 is defined in the bore 132 at the left side of the spool 133. The housing 109 is further formed with a bore 132a co-axial with the bore 132 and connected therewith through a passage 132b. A valve plug 144 having an inlet port 145 is secured to the housing 109 at the bore 132a. The inlet port 145 is connected with a pressure accumulator 149 which is charged by a hydraulic pump 101. In the bore 132a, there is disposed against the passage 132b a valve ball 146. A flow restriction member 148 is also disposed in the bore 132a so as to co-operate with the inlet port 145. A spring 147 is provided between the valve ball 146 and the restriction member 148 in such a manner that the ball 146 is urged toward the passage 132b and the restriction member 148 against the inlet port 145. The spool 133 has a valve actuating rod 142 secured to the spool 133 at the left end thereof in such a manner that it forces the ball 146 leftwardly to open the passage 132b when the spool 133 is displaced to the extreme left position. A spring 141 is disposed in the bore 132 to bias the spool 133 toward the right.

The spool 133 is formed with three axially spaced circumferential grooves 134, 135 and 136. The groove 134 is always in communication with a passage 128 through a check valve 153 and the groove 136 is always in communication with the return passage 151. The bore 132 is formed with a cavity 150 which is connected with the passage 171 and so located that it is out of communication with the grooves 134 and 136 but brought into communication with either of the grooves 134 and 135 when the spool 133 is shifted in either direction. The spool 133 also has an axial passage 138 which is opened at the left end thereof and connected through a radial port 137 with the groove 135.

The housing 109 is further formed with a cylindrical bore 115 in which an inlet port 110 in an inlet member 121 is opened at the intermediate portion thereof. At one side of the inlet member 121, there is disposed a piston 116 for sliding movement in the bore 115 to define a chamber 130 at the right side thereof. The piston 116 has an orifice 117 and is biased toward the left by means of spring 122 provided in the chamber. The inlet member 121 has an end projecting into the bore 115 to provide a stop surface for the piston 116. The bore 115 is formed at the right side of the piston 116 with an annular groove 125 which is connected through a passage 127 having a check valve 152 with the annular groove 140 in the bore 132. The groove 125 is also connected through a relief port 112 and a relief valve 114 with a return line leading to the reservoir 102.

A second piston 118 is disposed in the bore 115 at the left side of the inlet member 121 to define a chamber 131 at the left side of the piston 118. The piston 118 has an orifice 119 and is biased toward the right by means of a spring 123 disposed in the chamber 131. In the bore 115, there is defined an inlet chamber 129 between the pistons 116 and 118. The bore 115 is formed with an annular groove 126 which is connected with the passage 128. The groove 126 is so located that, when the piston 118 is shifted toward the right, it is connected with the chamber 131 but, when the piston 118 is shifted toward the left, it is disconnected from the chamber 131. The passage 128 is connected through a check valve 154 with the bore 132a. The inlet port 110 in the inlet member 121 is connected through a pressure line 103 with the hydraulic pump 101 which may be driven by a suitable power source (not shown).

The bore 115 is further provided with an annular groove 124 in such a location that it is connected with the inlet chamber 129 when the piston 116 is shifted toward the right under the influence of the pressure in the inlet chamber 129. The groove 124 is connected through an outlet port 111 with a power steering actuator 113.

When the hydraulic pump 101 is driven by an associated power source (not shown), pressurized fluid is introduced through the pressure line 103 into the inlet port 10 and therefrom into the inlet chamber 129. At the same time, the pressurized fluid is also introduced into the accumulator 149. Pressurized fluid in the chamber 129 is allowed to flow through the orifice 117 into the chamber 130 and then through the passage 127 having the check valve 152 into the annular groove 140. The fluid introduced into the groove 140 is then passed through the passage 170, the circumferential groove 169 on the power piston 158 and the passage 168 into the chamber 167 and thereafter through the passage 177, the widely open orifice 175 and the passage 176 into the pressure chamber 161. Since the spool 133 is normally maintained at the extreme right position under the action of the spring 141, the cavity 150 is connected through the groove 136 with the return passage 151. Thus, the pressure chamber 161 is connected with the reservoir 102. Since the orifice 117 in the piston 116 provides a resistance to flow of fluid passing therethrough, a pressure difference is established across the orifice 117. However, there is no remarkable flow resistance in the parts on the downstream side of the chamber 130, so that the chamber 130 and the parts on the downstream side thereof are maintained substantially at a pressure level of the reservoir 102. Thus, the piston 116 is shifted toward the right under the influence of the pressure in the inlet chamber 129 until the chamber 129 is opened to the outlet port 111. In this manner, pressurized fluid is supplied to the power steering actuator 113. Pressurized fluid is also supplied through the orifice 119 in the piston 118, the passage 128 and the check valve 153 into the groove 134, but it is blocked by the spool 133 since the groove 134 is out of communication with the cavity 150.

When the brake actuating pedal is depressed, the input piston 159 is displaced toward the left by the push rod 107 with the result that the terminal end of the piston rod 159a is moved toward the orifice member 165 to decrease the area of the orifice 175. Thus, the flow resistance through the orifice 175 is increased and pressure is built up in the chamber 167 and in the parts on the upstream side thereof. Therefore, the pressure in the chamber 140 acts on the right end surface of the spool 133 to displace the spool 133 toward the left until the groove 134 connects the passage 128 with the cavity 150. Pressurized fluid introduced from the hydraulic pump 101 through the line 103 and the inlet port 110 into the inlet chamber 129 is then allowed to flow through the orifice 119 and the passage 128 into the groove 134 and then through the cavity 150 and the passage 171 into the pressure chamber 161. The power piston 158 is then subjected to the pressure in the chamber 161 and shifted toward the left to actuate the brake master cylinder.

The pressure in the cavity 150 is transmitted through the port 137 and the passage 138 to the chamber 139 in the bore 132 until a sufficient pressure is built up in the chamber 139 to balance the pressure in the chamber 140. Thus, as in the previous embodiment, the pressure in the chamber 161 is proportional to that in the chamber 140. The pressure in the chamber 161 acts on the input piston 159 so that, when the pressure in the chamber 161 is not balanced with the force applied on the input piston 159 from the push rod 107, the area of the orifice 175 is automatically adjusted until a satisfactory balanced condition is established.

The orifice 119 in the piston 118 limits the amount of pressurized fluid to be supplied to the pressure chamber 161. Therefore, even when the brake pedal is rapidly actuated, it is ensured that a certain amount of pressurized fluid is always available to the power steering actuator 113.

When the hydraulic pump 101 fails to supply pressurized fluid for any reason, pressure will not build up in the chamber 167 even if the input piston 159 is leftwardly displaced and the area of the orifice 175 is decreased. However, when the input piston 159 is further displaced toward the left after the end of the piston rod 159 has abutted the orifice member 165, a pressure is built up in the chamber 167 and the pressure is transmitted to the chamber 140 through the passage 170. Therefore, the spool 133 is displaced toward the left and pushes the ball 146 by the rod 142 to open the passage 132b. The leftward displacement of the spool 133 also disconnects the cavity 150 from the return passage 151.

When the passage 132b is thus opened, the pressurized fluid is allowed to flow from the accumulator 149 through the inlet port 145, the passage 132b, the chamber 139, the axial passage 138 and the port 137 into the cavity 150. Then, the pressurized fluid is introduced from the cavity 150, through the passage 171 into the pressure chamber 161 to displace the power piston toward the left. Reverse flow of the pressurized fluid through the groove 134 into the passage 128 is blocked by the check valve 153.

When the pressure in the accumulator 149 is exhausted, the power piston 158 can be operated manually by shifting the input piston 159 further leftwardly after the orifice member 165 has reached the extreme left position.

Figure 3:
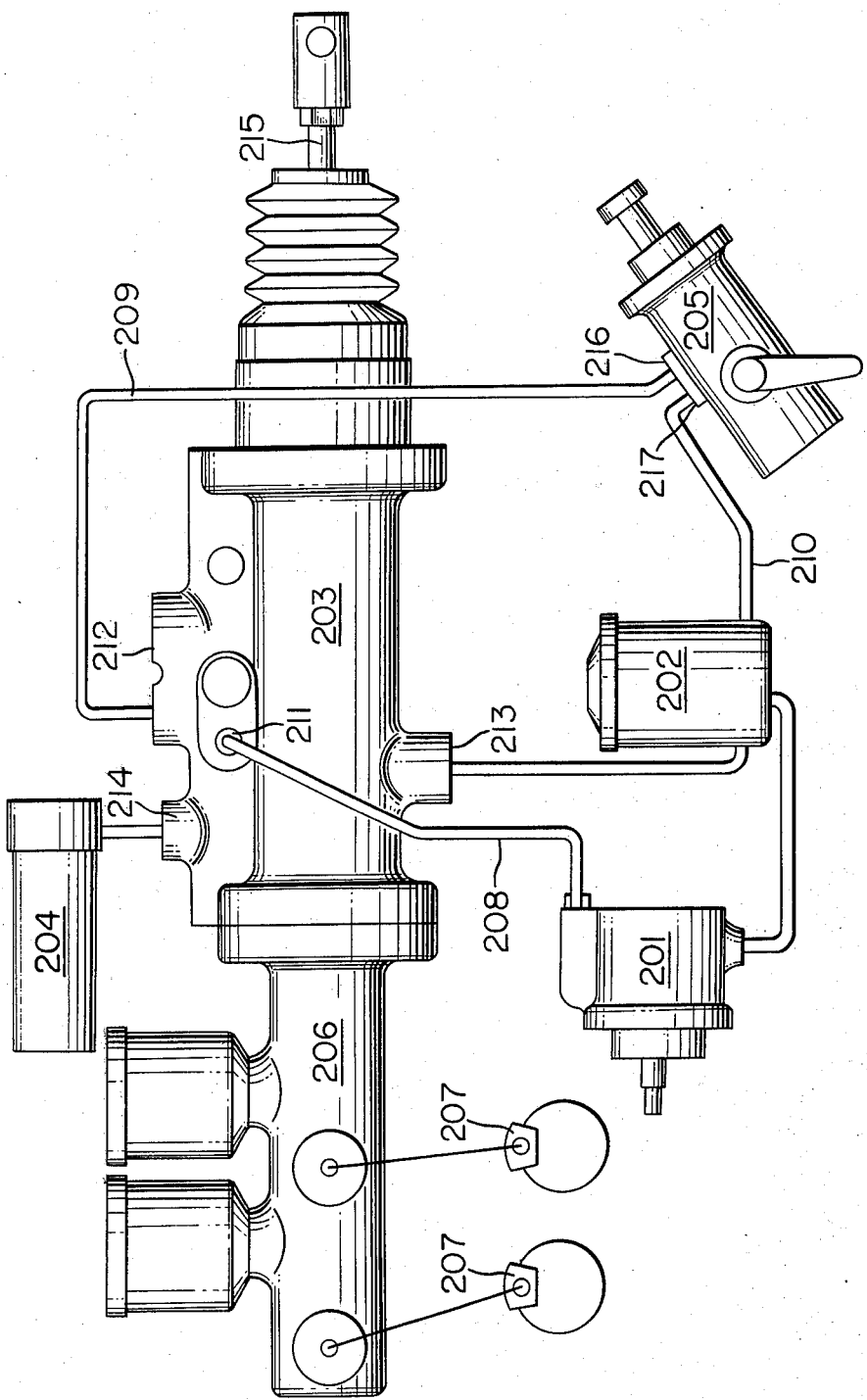
FIG. 3 is a side view of a hydraulic boosting device in accordance with a further embodiment of the present invention.
Figure 4:
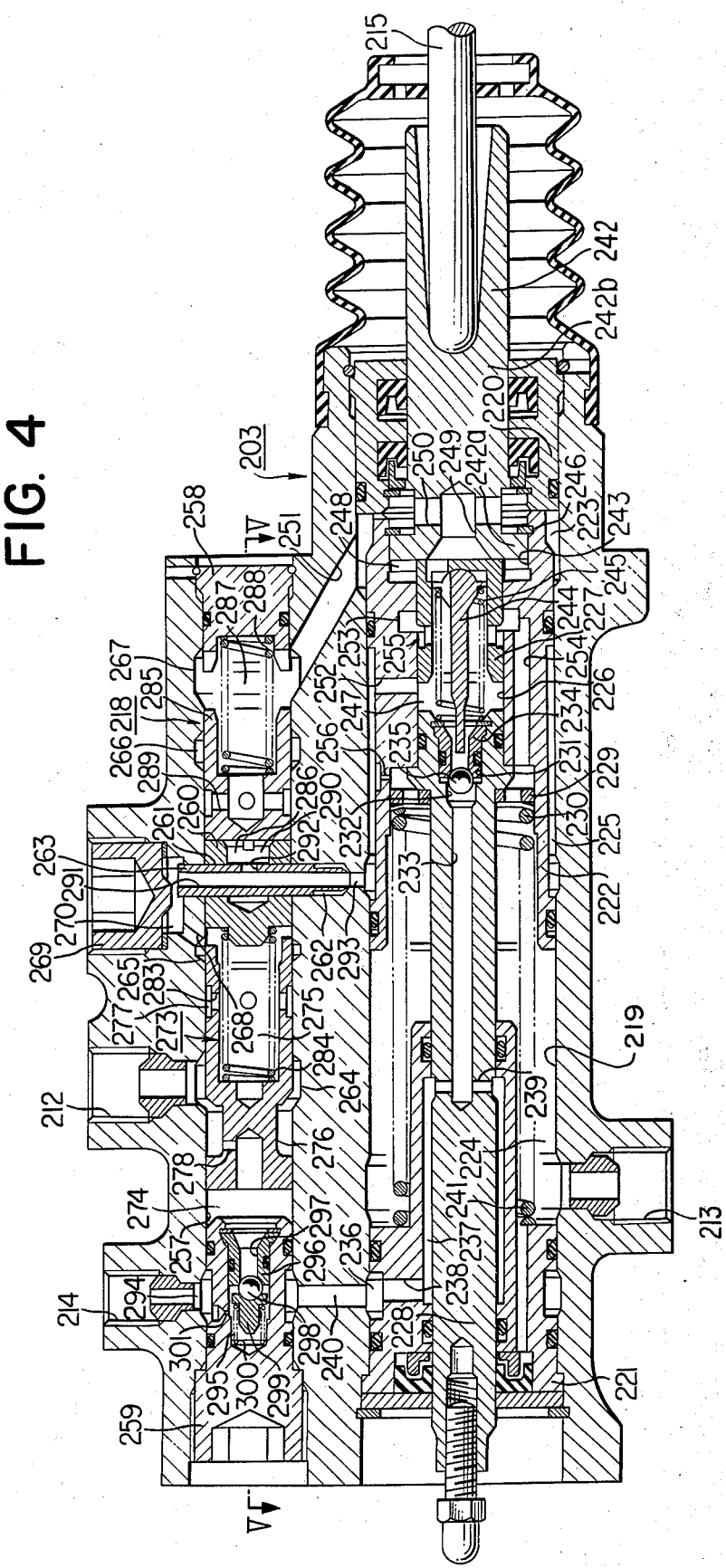
FIG. 4 is a sectional view of the boosting device shown in FIG. 3.
Figure 5:
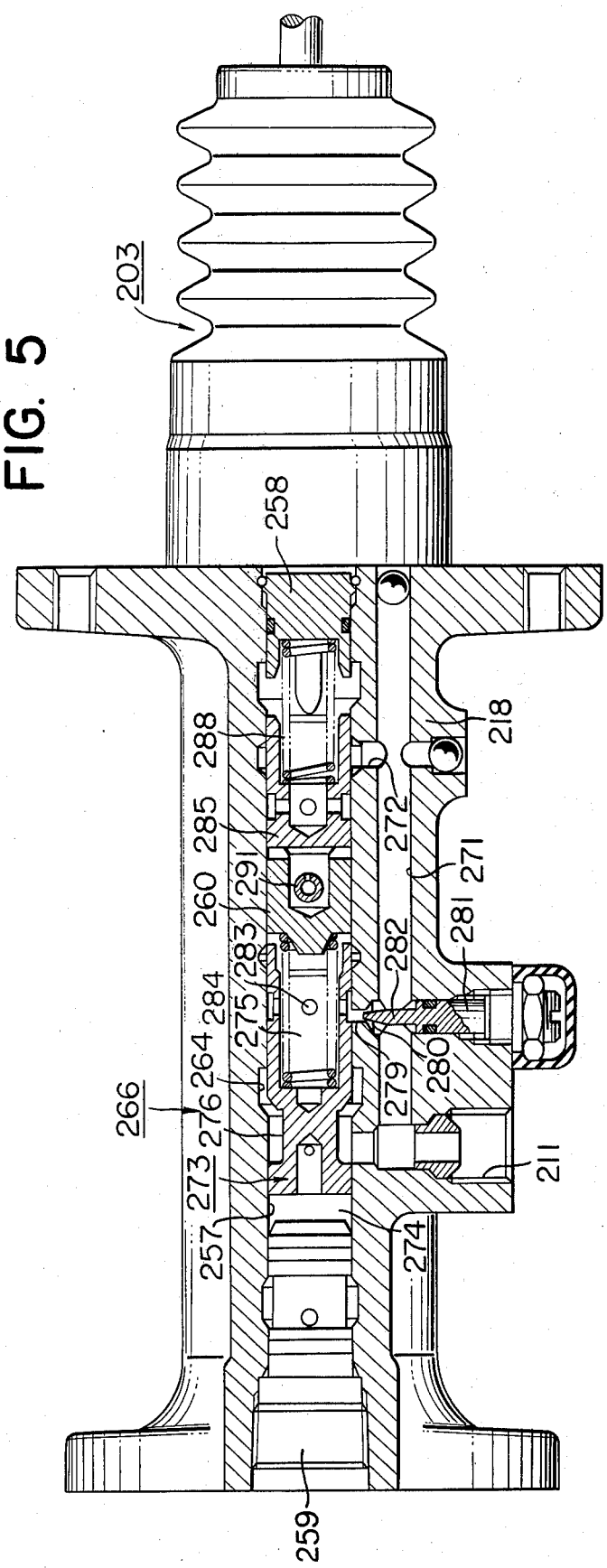
FIG. 5 is a sectional view taken substantially along the line V—V in FIG. 4.

Referring further to FIGS. 3, 4 and 5 which show another embodiment of the present invention, there is shown a hydraulic pump 201 which is so connected as to draw hydraulic fluid from a reservoir 202 and supplies the hydraulic fluid under pressure through a pipe 208 to an input port 211 of a boosting device 203. The boosting device 203 has an outlet port 212 which is connected through a pipe 209 with an inlet port 216 of a power steering actuator 205. The power steering actuator 205 has an outlet port 217 which is connected through a pipe 210 with the reservoir 202. The boosting device 203 also has an inlet port 214 which is connected with a pressure accumulator 204. Further, the boosting device 203 also has an outlet port 213 which is connected with the reservoir 202.

A brake master cylinder 206 combined with the boosting device 203 is hydraulically connected with brake actuating wheel cylinders 207. The brake boosting device 203 has an input rod 215 which may be connected with a brake actuating pedal (not shown) or the like.

Referring to FIG. 4, the boosting device 203 includes a housing 218 which is formed with a cylindrical bore 219. The housing 218 has a pair of end plates 220 and 221 secured thereto at the opposite ends of the bore 219. A power piston 222 is disposed in the bore 219 for sliding movement therein to define chambers 223 and 224 at the opposite sides thereof. The chamber 223 may be referred to as a pressure chamber and located at the side of the power piston 222 adjacent to the input rod 215. The chamber 224 may be referred to as a return chamber and is connected through the outlet port 213 with the reservoir 202.

The power piston 222 has an annular groove 225 on the outer peripheral surface thereof and an axial bore 226 formed therein. A spool 227 is axially slidably received in the bore 226 and an output rod 228 is secured to the power piston 222 at the end of the bore 226 facing to the chamber 224 by means of a ring-shaped spacer 229 and a clamping ring 230. The output rod 228 extends through the chamber 224 and the end plate 221 outwardly, and has a terminal end operatively connected with the input member of the master cylinder 206. The rod 228 is further formed with an axially extending passage 233 which continues to a bore 232 which is larger in diameter than the passage 233. Further, the rod 228 is counter-bored at its right end face to form a bore 231 which is connected with and has a diameter larger than the bore 232. In the bore 231, there is sealingly received a hollow valve seat member 234 and a co-operating ball 235 which is larger in diameter than the passage 233 is disposed in the bore 232 so as to close the hollow passage in the seat member 234.

The end closure member 221 is formed with an outer circumferential groove 236 and an inner circumferential groove 237 which are connected together through a radial passage 238. The inner groove 237 is further connected through radial passages 239 with the axial passage 233 and the outer groove 236 is connected with a passage 240.

The power piston 222 is biased toward the right to the position wherein it abuts the end plate 220 by means of a spring 241 disposed in the chamber 224 and acting between the end closure member 221 and the power piston 222. The power piston has an axially extending cylindrical bore 243 opening to the end surface facing to the pressure chamber 223, and an input piston 242 is slidably received in the bore 243 at its large diameter portions 242a. The input piston 242 has a piston rod or small diameter portion 242b which sealingly and slidably extends through the end plate 200 outwardly to be operatively engaged by the input rod 215.

The spool 227 is so arranged that it cooperates with the input piston 242 and biased toward the input piston 242 by means of a spring 245. Thus, the input piston 242 is also biased toward the left so that the large diameter portion 242a abuts a stop ring 246 provided on the power piston 222 at the open end of the bore 243. In the bore 226, there is defined, between the output rod 228 and the spool 227, a chamber 247 which is connected through an aperture 248 in the spool 227 and a passage 249 and 250 in the input piston 242 with the pressure chamber 223. The pressure chamber 223 is further connected with a passage 251 in the housing 218.

The power piston 222 includes a passage 252 connecting the outer circumferential groove 225 and the chamber 247, and an annular groove 253 formed in the bore 226. The groove 253 is connected through a passage 254 with the return chamber 224. The spool 227 has radially directed passages 255 which are so located that they connect the chamber 247 with the groove 253 when the input piston 242 and the spool 227 are in the extreme right positions as shown in FIG. 4. Thus, when the input piston 242 is actuated by an operator toward the left, the spool 227 is shifted toward the left as seen in FIG. 4 against the action of the spring 245 to disconnect the passages 255 from the groove 253 and also to close the passage 252 from the chamber 247. It will therefore be seen that the spool 227, the groove 253 and the passage 252 constitute a kind of shut-off valve means.

When the spool 227 is shifted toward the left, the ball 235 is moved apart from the seat member 234 by the rod 244 provided on the spool 227. A second orifice 256 is formed in the power piston 222 so as to connect the groove 225 with the return chamber 224.

The housing 218 is further formed with a cylindrical bore 257 which is located in parallel with the cylindrical bore 219. The bore 257 has opposite ends closed by plugs 258 and 259, respectively. A plug member 260 is also disposed in the bore 257 at the intermediate portion thereof and held in position by means of a radially extending pipe member 263 which is inserted into a radially extending hole 262 formed across the bore 257 in the housing 218 and a radial hole 261 formed in the plug member 260.

The cylindrical bore 257 has axially spaced circumferential grooves 264, 265, 266 and 267. The groove 264 is in communication with the outlet port 212, and the groove 265 with a passage 268 which is in turn connected with a chamber 270 defined in the housing 218 by a plug member 269 sealingly secured to the housing 218. Groove 266 is connected through passages 271 and 272 with the inlet port 211 (FIG. 5), and the groove 267 with the pressure chamber 223 through the passage 251.

As best seen in FIGS. 4 and 5, a spool valve 273 is disposed in the bore 27 257 between the plugs 259 and 260 for sliding movement therein and defines chambers 274 and 275 respectively with the plugs 259 and 260. The spool valve 273 has grooves 276 and 277 formed on the outer surface thereof. The groove 276 is connected on one hand through a passage 278 with the chamber 274 and on the other hand with the inlet port 211. The groove 277 is connected on one hand with the passage 271 through a first orifice 280 defined by an aperture 279 in the housing 218 and a tapered end 282 of an adjusting screw 281, and on the other hand through a passage 283 with the chamber 275. The adjusting screw 281 has an end exposed to the outside of the housing 218 so that it can be adjusted to obtain a desired area of the first orifice 280.

The spool valve 273 is biased toward the chamber 274 by means of a spring 284 provided in the chamber 275 in such a manner that is acts between the plug member 260 and the spool 273. FIG. 4 shows the spool 273 in the position wherein hydraulic pressure is introduced into the chamber 274 from the hydraulic pump 201 through the inlet port 211 and the spool 273 is forced toward the right under the pressure in the chamber 274 so that the groove 276 is opened to the groove 264 to provide a continuous flow to the outlet port 212.

A second spool 285 is disposed in the bore 257 between the plug members 260 and 258 for sliding movement therein to define chambers 286 and 287 with the plug members 260 and 258, respectively. The chamber 287 communicates through the groove 267 with the passage 251. The spool 285 is formed with passages 289 which lead to the chamber 287. Further, the spool 285 is biased toward the plug member 260 by means of a spring 288 which acts between the spool 285 and the plug member 258. In the position of the spool 285 illustrated in FIG. 4, the passage 289 is out of communication with the groove 266, but the passage 289 is brought into communication with the groove 266 when the spool 285 is shifted toward the chamber 287 under the influence of the pressure in the chamber 286 against the action of the spring 288. Thus, the spool 285 and the groove 266 constitute the first control valve means.

The chamber 286 is connected with the chamber 270 through a passage 290 in the plug 260, and a longitudinal passage 291 and a radial passage 292 both in the pipe member 263. The chamber 270 is in communication with the passage 291 and a further passage 293 in the housing 218 with the annular groove 225 formed in the outer surface of the power piston 222.

The plug member 259 is formed with an outer circumferential groove 294 which is connected with the outlet port 214. A passage 295 is formed in the plug 259 and opens to the chamber 274. In the open end of the passage 295, there is provided a seat member 296 which is sealingly secured to the plug 259 and has a longitudinal passage 297 formed therein. A ball 298 is disposed in the passage 295 in such a manner that it is forced against the passage 297 to close it by means of a spring 300 which acts thereon through a ball retaining member 299. Thus, a check valve is constituted to block fluid flow from the passage 295 to the chamber 274. The plug member 259 is further formed with an orifice 301 which connects the passage 295 with the groove 294, whereby restricted fluid flow is allowed to pass from the chamber 274 through the outlet port 214 into the accumulator 204.

When the hydraulic pump 201 is in operation, fluid in the reservoir 202 is drawn by the pump and discharged under pressure through the pipe 208 into the inlet port 211 of the boosting device 203. The pressurized fluid is then passed from the port 211 through the passage 278 into the chamber 274.

Fluid under pressure is also passed through the passage 271, the first orifice 280 and the passage 283 into the chamber 275. However, since the chamber 275 is in communication with the reservoir 202 through the groove 265, the passage 268, the chamber 270, the passages 291 and 293, the annular groove 225, the passage 252, the chamber 247, the passage 255, the groove 253, the passage 254, the return chamber 224 and the outlet port 213, pressure is not built up in the chamber 275. Thus, a pressure difference is produced between the chambers 274 and 275 so that the spool 273 is shifted toward the chamber 275 against the action of the spring 284, and the groove 276 is connected with the groove 264. Fluid from the inlet port 211 is thus allowed to pass through the outlet port 212 and the pipe 209 to the inlet port 216 of the power steering actuator 205.

In this instance, the pressure chamber 223 is in communication with the return chamber 224 through the passages 250, 249 and 248, the chamber 247 and the passages 255, 253 and 254 and is disconnected from the passage 271 by the second control valve. Thus, the power piston 222 and the output rod 228 connected thereto are in the retracted position.

When the power steering actuator 205 is operated in this instance, there will be a pressure build up in the pipe 209 and therefore in the chambers 274 and 275. However, the spool 273 functions in such a manner that a substantially constant pressure difference is maintained between the chambers 274 and 275 whereby a substantially constant flow can be maintained through the flow circuit which may be referred to as a pilot circuit and is constituted by the parts between the groove 265 and the passage 252. Thus, even when the power steering actuator 205 is operated, there will be no pressure increase in the pilot circuit. Since the spool 285 blocks the communication between the passage 271 and the pressure chamber 223, the power piston 222 is not affected by the actuation of the power steering actuator 205 at all.

When the power steering actuator is operated, the pressure increase in the chamber 274 causes to open the passage 296 by pushing the ball 298 apart therefrom. Thus, pressurized fluid is introduced through the port 214 into the accumulator 204 to be stored therein. The pressurized fluid from the accumulator 204 is normally prevented from entering the chamber 247 by the check valve ball 235 which closes the passage in the seat member 234.

When the brake pedal is depressed, the input rod 215 is moved leftwardly to shift the spool 227 through the input piston 242 toward the chamber 247 until the passage 255 is disconnected from the groove 253, so that the communication between the pressure chamber 223 and the return chamber 224 is interrupted. As the spool 227 is moved further leftwardly, the communication between the passage 252 and the chamber 247 is so restricted that ther will be an increase in the flow resistance to the fluid passing therethrough. Thus, a pressure is built up in the parts on the upstream side of the passage 252. The increased pressure in the chamber 286 causes the spool 285 to move toward the chamber 287 against the action of the spring 288 until the passage 289 is brought into communication with the groove 266. Thus, the pressurized fluid from the hydraulic pump 201 is allowed to pass through the passage 271, the chamber 287 and the passage 251 into the pressure chamber 223. The power piston is therefore displaced toward the left under the influence of the pressure built up in the pressure chamber 223 against the action of the spring 241 so as to actuate the brake master cylinder through the output rod 228.

The pressure in the chamber 223 also acts on the input piston 242 to produce a force against the force applied thereto by the rod 215. Thus, the position of the spool 227 is automatically adjusted until the pressure in the chamber 223 is balanced with the force applied to the input piston 242 from the input rod 215. When an excessively large input force is applied from the rod 215 to the input piston 242, the communication between the passage 252 and the chamber 247 is completely cut and the pilot fluid flow is passed through the orifice 256 to the return chamber 224. Since the orifice 256 is so designed that a substantial resistance is applied to the fluid flow passing therethrough, the pressure in the parts on the upstream side of the passage 252 is increased to the maximum value. It should of course be noted that the operation of the boosting device is not influenced by the actuation of the power steering actuator 205.

When the pump 201 fails to supply pressurized fluid for some possible reason, actuation of the input piston 242 will cause the leftward movement of the spool 227 against the spring 245 until the communication between the groove 253 and the chamber 247 as well as the communication between the passage 252 and the chamber 247 are completely interrupted. However, there will be no pressure increase in the chamber 223.

As the input piston 242 and therefore the spool 227 is moved further leftward, the rod 244 secured to the spool 227 is brought into engagement with the ball 235 which has been pressed against the seat member 234 under the influence of the pressure introduced from the accumulator 204 into the passage 233. The rod 244 then moves the ball 235 apart from the seat member 234 open the passage 233 to the chamber 247. The pressurized fluid stored in the accumulator 204 is thus allowed to flow from the passage 233 through the chamber 247 and the passages 249 and 250 into the pressure chamber 223 to actuate the power piston 222 toward left. In this instance, since the spool 285 is in the extreme left position under the influence of the spring 288, the chamber 223 is blocked from the inlet port 211. Therefore, there is no possibility that the fluid in the pressure chamber 223 is allowed to flow back into the hydraulic pump 201. It should of course be noted that, when the input force on the piston 242 is released, the spool 227 is returned toward the right under the force of the spring 245 so that the chamber 247 and the pressure chamber 223 are connected with the groove 253 which leads to the return chamber 224 through the passage 254.

When the pressure in the accumulator is exhausted, the output rod 228 can be manually actuated by moving the spool 227 further leftward after it engages the right end of the rod 228.

Figure 6:
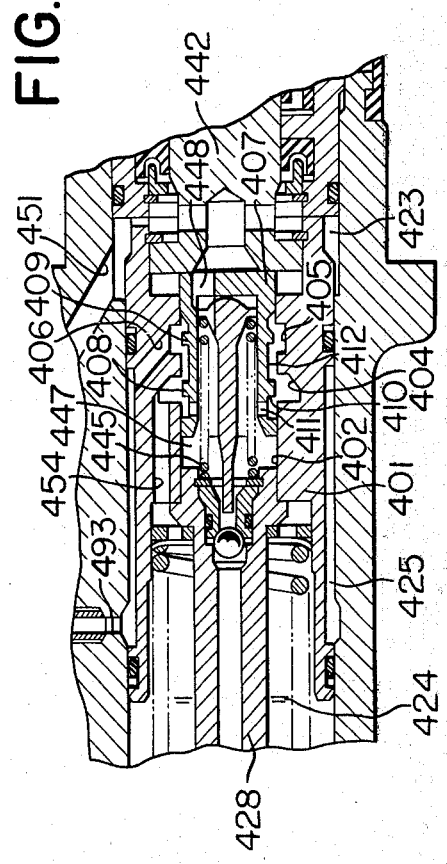
FIG. 6 is a fragmentary sectional view showing a further modified structure.

FIG. 6 shows a modification of the first control valve means used in the embodiment of FIGS. 3 to 5. In this arrangement, the power piston 401 has a bore 402 in which a spool 407 is slidably received. The spool 407 is so arranged that it can be actuated by an input piston 442 and biased toward the right by means of a spring 445. The bore 402 of the power piston 401 is formed with axially spaced annular grooves 404 and 405, the former being connected through a passage 454 with a return chamber 424 and the latter through a passage 406 with an annular groove 425 formed on the outer surface of the power piston 401 and adapted to receive a pilot flow. The spool 407 has axially spaced annular lands 408 and 409 which define a groove 412 therebetween. The spool 407 is further formed with a groove 410 which is located adjacent to the land 408 and connected through a passage 411 with the chamber 447.

In the position of the spool 407 illustrated in FIG. 6, the pressure chamber 423 is in communication with the return chamber through the passage 448, the chamber 447 and the passages 410, 404 and 454, and the pilot fluid is allowed to freely pass through the passage 493, the annular groove 425 and the passages 406, 405, 412 and 404 into the return chamber 424. Since the land 409 is so formed that it has an outer diameter smaller than that of the spool 407 itself whereby the grooves 405 and 412 are not completely closed even in the extreme left position of the spool 407.

When the input piston 442 is actuated by an operator toward the left, the spool 407 is also shifted toward the left to such a position that the connection between the grooves 410 and 404 is interrupted by the land 408 and the communication between the grooves 405 and 412 is restricted by the land 409 to obtain an increased pilot pressure. Then, hydraulic fluid is supplied under pressure from the second control valve means which has been described in connection with the previous embodiment, through the passage 451 into the pressure chamber 423. When an excessive force is applied to the input piston 442, the spool 407 is moved further leftward until the land 409 interrupts the communication between the grooves 405 and 412. However, even in this position of the spool 407, a flow passage of a predetermined flow resistance is maintained between the bore 402 and the land 409 because the land 409 has an outer diameter smaller than that of the spool 407 itself. Thus, there is defined an orifice which functions as the orifice 256 in the previous embodiment. This orifice construction is advantageous over the orifice 256 in the previous embodiment since it is easier to manufacture and free from clogging by foreign objects. Further, by properly determining the configuration of the land 409, it is possible to reduce the level of noise produced by hydraulic fluid passing through the orifice construction.

The invention has thus been shown and described with reference to specific embodiments, however, it should be noted that the invention is in no way limited to the details of the illustrated embodiments but changed and modifications may be made without departing from the scope of the appended claims.

I claim:
1. A hydraulically operated power booster system comprising:
   a. a hydraulic pressure source;
   b. a hydraulic pressure reservoir;
   c. power cylinder means;
   d. power piston means positioned in said power cylinder means;
   e. power pressure chamber means defined in said power cylinder means at one side of said power piston means;
   f. orifice means disposed between said hydraulic pressure source and said hydraulic pressure reservoir and having opening means for normally allowing unrestricted flow of hydraulic fluid from said hydraulic pressure source to said hydraulic pressure reservoir;
   g. manually operated means for restricting said opening means for establishing a hydraulic pressure drop thereacross;
   h. a flow divider disposed between said hydraulic pressure source and said orifice means; and
   i. first control valve means having spool means, shiftable in response to hydraulic pressure established on the upstream side of said orifice means in a chamber defined by said first control valve means, for introducing hydraulic pressure from said hydraulic pressure source into said power pressure chamber means, and wherein said chamber receives a flow of hydraulic fluid from said flow divider, the flow of hydraulic fluid from said chamber being restricted for establishing hydraulic pressure therein when the manually operated means cooperates with said opening means of said orifice means for establishing the hydraulic pressure drop thereacross.

2. Hydraulically operated power booster system in accordance with claim 1 in which said orifice means comprises a manual member and an output member.

3. Hydraulically operated power booster system in accordance with claim 1 wherein said orifice means includes control cylinder means, and control piston means slidably received in said control cylinder means, and the system further including hydraulic pressure accumulating means, second control valve means for connecting said accumulating means with said pressure chamber means when said second control valve means is opened, and means for opening said second control valve mens when the control piston means is shifted beyond a predetermined distance during failure of said hydraulic pressure source.

4. Hydraulically operated power booster system in accordance with claim 3 in which said control piston means includes a longitudinal passage for forming said opening means of the orifice means, and said manually operated means includes an input member having means for co-operating with the longitudinal passage in the control piston means to define a variable orifice therebetween.

5. Hydraulically operated power booster system in accordance with claim 4 in which said input member is an input piston positioned for being subjected to the hydraulic pressure in said pressure chamber means.

6. Hydraulically operated power booster system in accordance with claim 4 in which said control cylinder means is formed in said power piston means and wherein the power piston means can be actuated by the input member during failure of the hydraulic pressure source.

7. Hydraulically operated power booster system in accordance with claim 3 in which said control piston means defines a chamber in said control cylinder means, and said means for opening the second control valve means includes spool means shiftable for opening the second control valve in response to the pressure established in said chamber in the control cylinder means when the control piston means is shifted beyond said predetermined distance.

8. Hydraulically operated power booster system in accordance with claim 3 in which said control piston means includes a longitudinal passage for forming said opening means of the orifice means, and said means for opening the second control valve means includes spool means shiftable for opening the second control valve means in response to the pressure established in the upstream side of the longitudinal passage when said control piston means is shifted beyond said predetermined distance during failure of the hydraulic power source.

9. Hydraulically operated power booster system in accordance with claim 8 in which said means for opening the second control valve means is a rod member on said control piston means directly engageable with said second control valve means for opening said second control valve means.

10. Hydraulically operated power booster system in accordance with claim 3 in which said control cylinder means is formed in said power piston means and a pilot hydraulic flow passage is formed through said control cylinder means for communicating said hydraulic pressure source with said hydraulic pressure reservoir, and wherein said control piston means is disposed in said control cylinder means for restricting the pilot hydraulic flow passage when said control piston means is shifted in one direction for establishing a hydraulic pressure to open said first control valve means.

* * * * *